United States Patent [19]

Downs

[11] 4,231,735
[45] Nov. 4, 1980

[54] RADIANT HEATER

[76] Inventor: Edgar S. Downs, 6530 Huntley Rd., Worthington, Ohio 43085

[21] Appl. No.: 885,535

[22] Filed: Mar. 13, 1978

[51] Int. Cl.³ .............................................. F23D 7/00
[52] U.S. Cl. .................................. 431/328; 431/261; 431/353; 432/222
[58] Field of Search ................ 432/222, 223; 431/328, 431/329, 353, 170, 171, 176, 261; 126/91 R, 59.5, 93

[56] References Cited

U.S. PATENT DOCUMENTS

| | | | |
|---|---|---|---|
| 2,869,626 | 1/1959 | Sherman | 431/171 |
| 2,879,837 | 3/1959 | Downs | 431/328 |
| 3,029,863 | 4/1962 | Downs | 431/169 |
| 3,603,711 | 9/1971 | Downs | 431/352 |

*Primary Examiner*—Carroll B. Dority, Jr.
*Assistant Examiner*—Lee E. Barrett

*Attorney, Agent, or Firm*—William V. Miller

[57] ABSTRACT

A radiant heater in which the fuel is supplied at an inlet end of a combustion chamber, formed by an imperforate tubular shell, where combustion takes place, and the products of combustion are forced axially in one direction through the tubular shell, which is elongated to provide a substantial heat radiating wall, and out through an outlet end thereof. Surrounding the first shell, is a second tubular shell, which is concentric with the first shell to provide a second substantial heat radiating wall and an annular chamber which receives the products of combustion from the combustion chamber, directs them axially in a reverse direction, and permits them to discharge outwardly through radial outlets provided in said second radiating wall. Combustion is accomplished by a burner which is located at the inner end of the first shell to cooperate therewith and with the second shell in an effective manner to obtain maximum combustion and radiation.

1 Claim, 3 Drawing Figures

RADIANT HEATER

BACKGROUND OF THE INVENTION

In my U.S. Pat. No. 3,603,711, a liquid fuel burner of the atomizing type is disclosed in which the fuel and air for combustion are supplied at one end of the tubular chamber and the products of combustion are discharged axially at the other end of the chamber.

The present invention is applicable to the particular type of heater disclosed in that patent which is usually a relatively small heater of the portable type with its axis horizontal, although not necessarily limited to that type, since the heater can be in a fixed location and, if desired, have its axis vertical. This type of heater also usually does not need a stack, since the nature of the burner is such that there is substantially complete combustion with a clean flame. However, the present invention is also applicable to heaters having similar arrangements of gas burners.

SUMMARY OF THE INVENTION

It has been determined, in actual use, that heaters of the general type indicated above will function more effectively to provide more BTU for the fuel used, if instead of discharging the products of combustion out of the outlet end of the tubular combustion chamber into the space to be heated, and relying mainly on heat by convection, more heat radiating surfaces are provided within the heater and the products of combustion are caused to traverse those surfaces for relatively longer periods of time before being discharged into the space to be heated.

This is accomplished, according to the present invention, by providing an inner imperforate tubular shell which has the fuel burner at an inlet end thereof and an outlet at its other end. The inner shell is elongated to provide an ample heat-radiating wall. Surrounding the first shell and concentric relative thereto, is a second shell to provide an annular chamber therebetween. This second shell is also of elongated form to provide an ample radiating outer wall but is provided with radial outlets, in its peripheral wall, for the hot products of combustion to escape to the surrounding space or room to be heated. However, the products of combustion will first flow axially in one direction through the inner shell, to heat the inner shell, which will radiate heat into and through the annular surrounding outer wall and then pass, in a reverse direction, through the annular chamber, in contact with both the hot inner wall and the outer wall and permit radial flow of the products of combustion outwardly through the radial outlets thereof. Thus, there will be heating mainly by radiation from the inner and outer walls but some by convection due to the products of combustion passing through the radial outlets therein. The inner and outer shells are arranged not only to provide for heat radiation but to provide a burner surrounding the pressure-atomizing nozzle which may receive and absorb non-atomized droplets for further burning and to supply secondary air for that burning.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
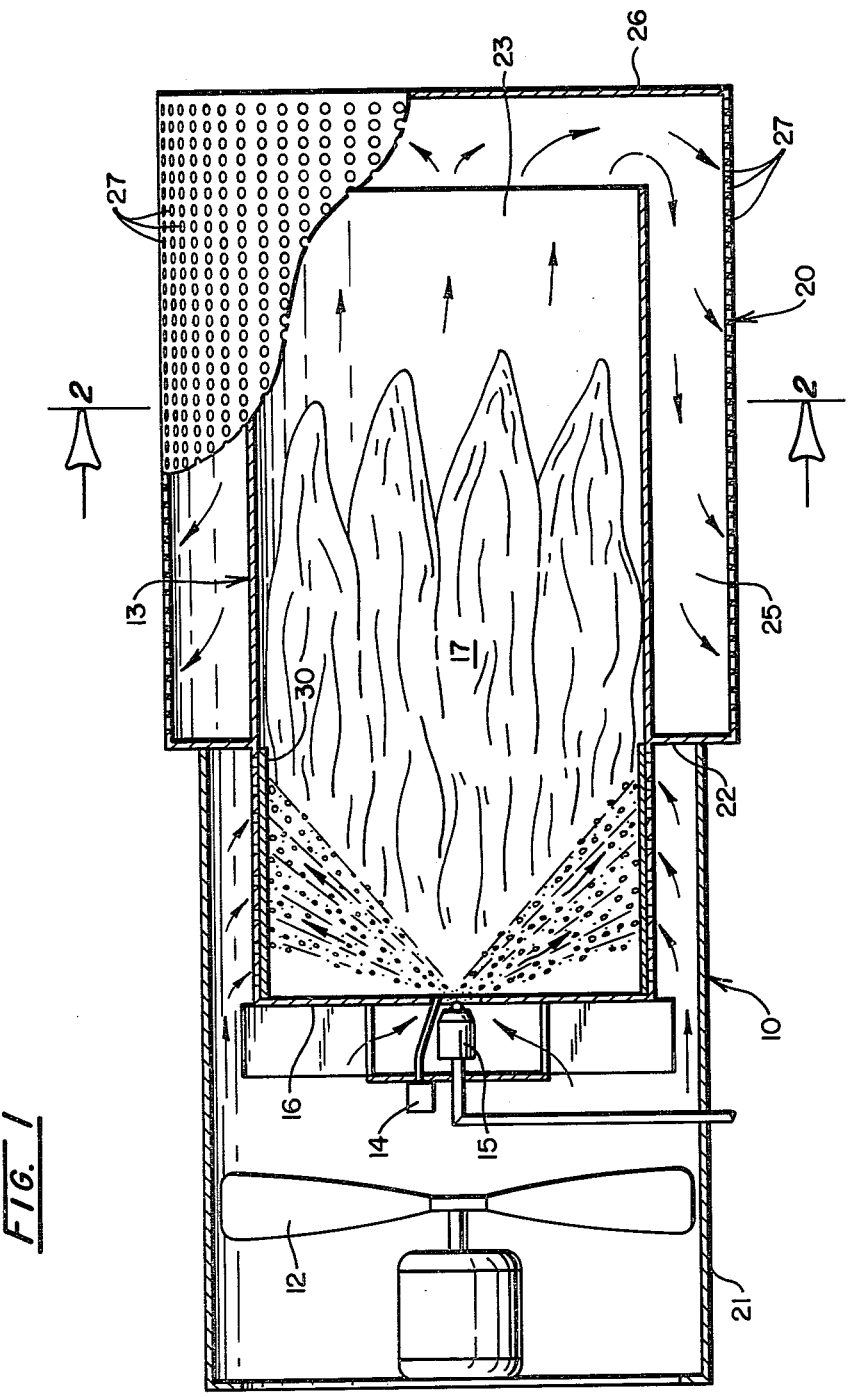
FIG. 1 is an axial sectional view of a radiant heater embodying this invention.

With reference to FIG. 1, there is shown a heater embodying this invention which has a burner arrangement like that disclosed in U.S. Pat. No. 3,603,711.

The heater includes an outer casing 10 of annular tubular form which is closed at its one end 11 and has a fan or blower 12 mounted within the casing at that end. Ahead of the fan, is a liquid fuel atomizing burner nozzle 15 and an associated spark igniter 14. The members 14 and 15 are mounted in cooperation with a flat rear wall 16 of a combustion chamber 17 formed by an inner shell 13 of annular tubular form. Preferably both casing 10 and inner shell 13 are formed of stainless steel sheet metal. In this type of heater, the burner includes a surrounding annular wall section 30 at the inner end of the shell 13 which is of high porosity and high capillarity. Secondary air for combustion is supplied through this wall by the fan 12 as indicated by the arrows, and primary air is supplied through wall 16 adjacent to the atomizing nozzle 15. The wall 30 will receive liquid fuel droplets and absorb them. Some of the atomized fuel will burn before it reaches the wall 30 and the rest will burn at the wall, producing a desired flame pattern in the combustion chamber 17, as described in said patent.

Figure 2:
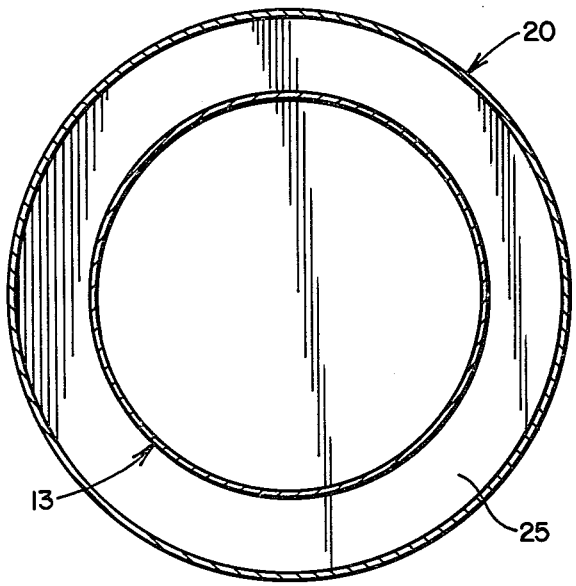
FIG. 2 is a transverse sectional view taken along line 2—2 of FIG. 1.
Figure 3:
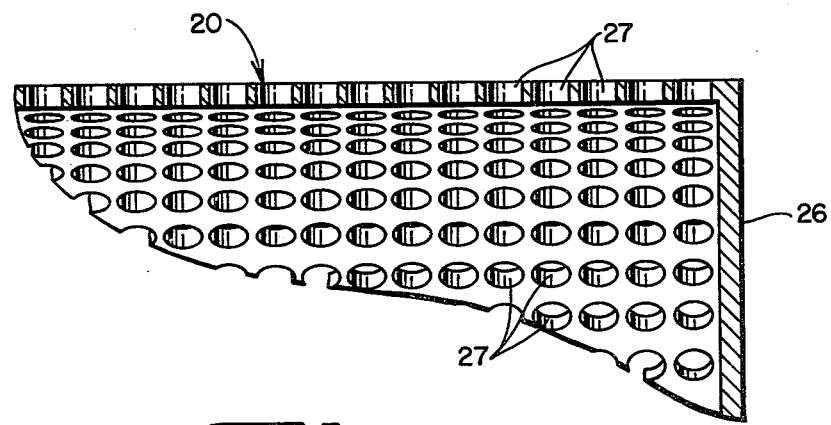
FIG. 3 is an enlarged fragmentary axial sectional view of a portion of the perforated outer casing section of the heater.

The outer casing 10, according to the present invention, includes an enlarged forward section 20, (FIGS. 1, 2 and 3) which provides an outer heat-radiating peripheral wall. This section is of annular tubular form of greater diameter than the rear section 21 of the outer casing. An inwardly extending flange 22, at the junction of the two sections, provides a baffle for directing the secondary air from the fan 12 through the porous wall 30. This flange 22 surrounds and supports the inner shell 13, which has at its inlet end, the flat wall 16 and has its opposite or outlet end completely open, as indicated at 23.

It will be noted that the outer casing section 20 is of greater diameter than the inner shell 13 so as to produce an annular chamber 25 therebetween which is closed at its rear end by the flange 22. The outlet end of the shell 13 is open at 23 and is spaced from the flat imperforate wall 26 of the casing section 20. Thus, the combustion chamber 17 communicates with the annular chamber 25 at this end. The outer radiating wall provided by the casing section 20 is provided with a pattern of closely-spaced radial outlets 27.

Thus, the products of combustion formed at the inlet end of the combustion chamber 17, will travel axially along the interior of the inner shell 13, heating the elongated heat-radiating wall provided thereby. These products of combustion will travel out of the outlet end of the combustion chamber 17, as indicated by the arrows, (FIG. 1) into contact with the flat imperforate wall 26 of the outer casing section 20. Then, they will be directed radially outwardly into the annular chamber 25 and, in a reverse direction, toward the wall 22. The products of combustion will gradually escape through the radial outlets 27, along the peripheral outer heat-radiating wall of the outer casing section 20.

As a result of the flame and the hot products of combustion, the elongated heat-radiating wall of the inner shell 13 is heated entirely along is length. In actual tests, it has been observed that this wall reached a temperature of 1800° F. The products of combustion pass from the outlet end 23 of the inner shell 13, radially outwardly and, in a reverse direction, along the outer heat-radiating wall of the outer shell section 20. It has been observed that this wall reaches a temperature of 1400° F. Thus, two elongated tubular heat-radiating walls are provided, the inner wall radiating heat, in the form of infra-red rays, to the outer wall and directly through the perforations 27 of this outer wall, also heating this wall so that it radiates heat in the form of infra-red rays. Furthermore, the gases which pass through the annular space 25 are heated by both hot walls and as they finally discharge through the radial perforations, they heat the surrounding space by convection. However, most of the heat developed by this heater is by radiation as it will be understood that the pressure developed by fan 12 usually does not raise much pressure flow from the radial outlets 27.

It will be apparent that this invention provides concentric inner and outer heat-radiating walls of annular tubular form, the inner combustion chamber wall being imperforate at its outer section and the outer casing wall being perforated at its outer section. An annular space or passage is provided between such outer section of the walls. Combustion is created within the inner wall and the hot products are caused to travel longitudinally in one direction therewithin to a remote outlet end, pass radially outwardly, and then rearwardly in a reverse longitudinal direction through the annular space and discharge outwardly through radial perforations in the outer wall. The inner wall is heated to such an extent that it radiates infra-red rays to and directly through the outer wall and the outer wall becomes heated to such an extent that it radiates infra-red rays to the surrounding space to be heated. Hot gases also issue through said radial perforations of the outer wall to heat the surrounding space. The arrangement of the outer and inner walls at their inner ends provides an annular chamber of considerable axial extent for receiving secondary air. This surrounds a perforated inner section of the inner shell or combustion chamber wall which, in turn, is covered by the high-porosity and high capillarity annular wall which will receive and absorb droplets not atomized by the nozzle mounted at the center thereof.

Having thus described this invention what is claimed is:

1. A radiant heater comprising an outer tubular casing closed at its forward end by a transverse imperforate wall and having a rear substantially imperforate peripheral wall section and a forward perforated peripheral wall section, an inner shell disposed with its peripheral wall concentrically within the casing but spaced radially inwardly therefrom and being substantially closed by a transverse wall at its rear end but open at its forward end, a fan within the outer casing behind said transverse rear wall, said inner shell extending from a point where its rear wall is just ahead of the fan through the imperforate section of the outer casing and on through the perforated section thereof to a point spaced from the imperforate front transverse wall of the casing, a pressure-type liquid fuel atomizing burner nozzle disposed for injecting fuel through a central opening in said transverse rear inner shell wall, said central opening also permitting the entrance of primary air, said inner shell having a rear perforated peripheral wall section which is adjacent its transverse rear wall for permitting the radial inlet of secondary air but is imperforate throughout most of its length forwardly thereof, said perforated peripheral rear wall section of the inner shell having mounted on its inner surface in covering relationship to it an annular wall section which is of high porosity and high capillarity so as to produce a combustion chamber, the space between the rear peripheral imperforate wall section of said casing and the perforated peripheral rear wall section of said inner shell forming an annular chamber for receiving secondary air from said fan which is closed at its forward end so the secondary air will flow therefrom radially inwardly through said perforated section and the covering annular high porosity and high capillarity wall section into the combustion chamber therewithin, non-atomized droplets from the nozzle that may reach it being absorbed by said wall section and burning thereof being aided by said secondary air, other fuel atomized by the nozzle producing a desired flame pattern in the forward portion of the inner shell, the products of combustion travelling axially along the interior of the tubular inner shell to heat it and then radially outwardly at its forward end and rearwardly through the annular space between the imperforate peripheral wall section of the inner shell to further heat it and the perforated peripheral wall section of the outer casing to heat it, said last-named annular space being closed at its rear end to separate it from said annular chamber so that the products of combustion will finally flow radially outwardly through the perforated peripheral wall section of the outer casing.

* * * * *